United States Patent Office 2,885,322
Patented May 5, 1959

2,885,322

DIOCTYL SODIUM SULFOSUCCINATE SOLUTIONS IN CAPSULES

Lyell J. Klotz, Cincinnati, Ohio, assignor to Lloyd Brothers, Inc., Cincinnati, Ohio, a corporation of Ohio No Drawing. Application May 1, 1956
Serial No. 581,855

4 Claims. (Cl. 167—56)

The present invention relates to means for solubilizing dioctyl sodium sulfosuccinate in oils and resulting compositions having utility in the treatment of constipation.

The use of dioctyl sodium sulfosuccinate in milk, fruit juices and the like for treating constipation has been proposed heretofore. Wilson and Dickinson J.A.M.A., vol. 158, pages 261–263 (1955). See also Vaughan application Serial No. 537,873, filed September 30, 1955. The use of dioctyl sodium sulfosuccinate for the treatment of constipation has been demonstrated as safe, reliable and effective and it is available today for this purpose in the form of oil solutions in capsule form.

Difficulties have been encountered in preparing sufficiently concentrated solutions of dioctyl sodium sulfosuccinate in oil so that capsules of desirable size and content can be used. This has been due (1) to the tendency of the dioctyl sodium sulfosuccinate to precipitate from the oil solutions when present in desirable concentrations, particularly at room temperature and below and (2) to the failure of commonly available oils to dissolve dioctyl sodium sulfosuccinate at other desirable concentrations. As for (1), it was found, for example, that ¼ ml. capsules containing about 40 mg. of dioctyl sodium sulfosuccinate per capsule tend to undergo separation with precipitation of the dioctyl sodium sulfosuccinate, when the temperature falls below room temperature. Furthermore, solutions of this or greater strength are encapsulated only with difficulty because of the separation of the dioctyl sodium sulfosuccinate. As for (2), it was found, for example, that ¼ ml. capsules containing 60 mg. or more of dioctyl sodium sulfosuccinate per capsule could not be satisfactorily prepared as the limited amount of oil present was not sufficient to dissolve the dioctyl sodium sulfosuccinate. These characteristics posed limitations and serious problems both in the encapsulating operation and in the final preparation of pharmaceutically acceptable stable capsules having the desired pharmaceutical elegance and providing the therapeutically useful dosage in convenient, practical capsule size.

Commercial experience in this field has demonstrated that it is desirable, for practical purposes, to have the dioctyl sodium sulfosuccinate in solution in the oil, and further, that the resulting solutions should preferably be free from any tendency to separate at temperatures as low as 10° C. In attempts to solve this problem, known as well as some unknown possible pharmaceutically acceptable solubilizing agents were investigated along with various types of oils. All agents tried were either found lacking for one reason or another or were therapeutically unacceptable until the glyceryl oleates were found to be compatible with both the oil and the dioctyl sodium sulfosuccinate, and unexpectedly discovered to be capable of solubilizing the latter in the oil. The resulting solutions were also found to be stable and, if sufficient solubilizer is present to be free from separation at refrigerating temperatures.

The following examples will serve to illustrate the invention.

EXAMPLE I

Dioctyl sodium sulfosuccinate __ 661 lbs., 5 oz., 340 grains.
Glyceryl mono-oleate _____ 13 gal., 1 pt., 10 fl. oz., 425 minims.
Mineral oil, q.s. ad 330 gal., 2 pt., 61 minims.

(1) Add the glyceryl mono-oleate to the dioctyl sodium sulfosuccinate and then add about 160 gallons of mineral oil.
(2) Heat to about 100° C. and stir until the dioctyl sodium sulfosuccinate is completely dissolved.
(3) Add sufficient mineral oil to bring volume to about 330 gallons. Mix and allow to cool to room temperature.
(4) Add sufficient mineral oil to bring to exact volume given above. Mix well, and filter.
(5) Encapsulate into 5,000,000 ¼ ml. (4 minims) each soft gelatin capsules.

The capsules prepared as above contain 60 mg. of dioctyl sodium sulfosuccinate per capsule.

EXAMPLE II

This example corresponds to and is prepared in accordance with Example I, except that 1322 lbs., 10 oz., 680 grains of dioctyl sodium sulfosuccinate are used in place of the amount called for in Example I. The ¼ ml. capsules prepared as above contain 120 mg. of dioctyl sodium sulfosuccinate per capsule. In a similar manner 2, 3, 4 or 8 minim capsules can be readily prepared containing 40–240 mg. of dioctyl sodium sulfosuccinate.

Due to ease of administration of relatively small capsules compared to relatively large capsules about 4 minims size capsules i.e. capsules containing ¼ ml. of solution, are preferred. The following table illustrates the approximate amount of materials required to make 100 ml. of solution for use in the preparation of 400 capsules of this type.

Table

|  | A | B | C |
|---|---|---|---|
| Diocytyl Sodium Sulfosuccinate _____ g. | 16 | 24 | 48 |
| Glyceryl mono-oleate _____ ml. | 0.5 | 0.5 | 2.5 |
| Mineral Oil, q.s. to make 100 ml. _____ ml. | 87 | 80 | 58.5 |

The solutions of A, B and C can be used to make ¼ ml. capsules containing, respectively, 40 mg., 60 mg. and 120 mg. of dioctyl sodium sulfosuccinate. Similarly, the solutions can be used to make ⅛ ml. (2 minims) capsules containing, respectively, 20 mg., 30 mg. and 60 mg. of dioctyl sodium sulfosuccinate, and ½ ml. (8 minims) capsules containing 80 mg., 120 mg. and 240 mg. of dioctyl sodium sulfosuccinate. For most purposes, where high concentrations are desired, capsules of around the ¼ ml. size and containing up to 200 mg. of dioctyl sodium sulfosuccinate with about 3.5–4.5% by volume of glyceryl oleate are generally preferred.

The glyceryl oleates employed in the present invention are selected from the class of glyceryl mono- and di-oleates or mixtures of the same. They are equivalents for purposes of the present invention and the desired solubilizing effects can be readily obtained by use of the commercially available glyceryl mono- and di-oleate preparations. These preparations normally contain mixtures of the mono- and di-oleates along with or without some glyceryl tri-oleate. For example, the commercial glyceryl mono-oleate is made up primarily of the mono-oleate along with some di-oleate and the commercial glyceryl di-oleate is made up primarily of the di-oleate along with some mono-oleate.

The glyceryl mono- or di-oleate or mixtures of the same can be present in about 0.5 to 25% by volume of the total volume of the oil solution. Larger amounts e.g. up to 50% by volume, can be employed although the use of more than about 4% by volume has been found not to result in any appreciable additional beneficial effects at ordinary concentrations of the type described above. Smaller amounts can also be employed, for example, about 0.25% in ¼ ml. capsules containing 40 mg. of dioctyl sodium sulfosuccinate, although the use of at least about 0.5% with a range of about 0.5 to 5% by volume is preferred even at the lower concentrations to prevent possible precipitation of the dioctyl sodium sulfosuccinate at refrigerating temperatures i.e. the low temperatures (e.g. about 10° C.) at which pharmaceutical preparations are frequently shipped and stored. The present invention is thus directed in essence to stable solutions made up of dioctyl sodium sulfosuccinate and glyceryl mono- and/or di-oleates in a pharmaceutical oil carrier where the ratio of oil to dioctyl sodium sulfosuccinate is such that the oil per se will not dissolve the dioctyl sodium sulfosuccinate (or if in solution will not maintain it in solution at temperatures below room temperature e.g. about 20° C. or less), and the ratio of glyceryl oleate to the total volume of the solution is such that the oil will dissolve the dioctyl sodium sulfosuccinate and maintain it in solution at temperatures below room temperature.

The oils employed in the present invention are selected from the well-known non-toxic, inert, liquid oil class used as pharmaceutical carriers or diluents. These include mineral oil, vegetable oils such as linseed, corn, cottonseed, peanut and the like oils as well as animal oils such as lard oil. The preferred oil is the relatively inexpensive pharmaceutical or medicinal grade of mineral oil.

The solutions of the present invention can be advantageously employed in capsule form as shown above. The solutions can also be used in suppository form, e.g. incorporated in cacao butter or like base. The solutions in addition can be employed as a medium or carrier for other pharmaceutically active materials e.g. scopolamine methyl bromide, etc.

I claim:

1. A composition in dosage unit soft gelatin capsule form for treating constipation comprising a mineral oil solution containing 40–200 mg. of dioctyl sodium sulfosuccinate and about 0.5 to 25% by volume based on the total volume of the oil solution of a member selected from the group consisting of glyceryl mono- and di-oleates, the ratio of mineral oil to dioctyl sodium sulfosuccinate in said gelatin capsule being such that the mineral oil per se will not maintain the dioctyl sodium sulfosuccinate in solution in the absence of said glyceryl oleate.

2. A composition in dosage unit soft gelatin capsule form for treating constipation comprising about ¼ ml. of a mineral oil solution containing about 40 mg. of dioctyl sodium sulfosuccinate and about 0.5 to 5% by volume based on the total volume of the oil solution of glyceryl mono-oleate.

3. A composition in dosage unit soft gelatin capsule form for treating constipation comprising about ¼ ml. of a mineral oil solution containing about 60 mg. of dioctyl sodium sulfosuccinate and about 0.5 to 5% by volume based on the total volume of the oil solution of glyceryl mono-oleate.

4. A composition in dosage unit soft gelatin capsule form for treating constipation comprising about ¼ ml. of a mineral oil solution containing about 120 mg. of dioctyl sodium sulfosuccinate and about 3.5 to 4.5% by volume based on the total volume of the oil solution of glyceryl mono-oleate.

References Cited in the file of this patent

UNITED STATES PATENTS

| | | |
|---|---|---|
| 629,141 | Weyland | July 18, 1899 |
| 1,087,843 | Smith | Feb. 17, 1914 |
| 2,327,564 | Scherer | Aug. 24, 1943 |

OTHER REFERENCES

Aerosol Wetting Agents, Am. Cyanamid and Chem. Corp., N.Y.C. (Booklet), 1941, pp. 3, 4, 8, 13–16, 45–48, 67–68.

Greenberg: Handbook of Cos. Materials, Intersci. Pub. Co., N.Y.C., 1954, pp. 140–141 and 230.

Wilson et al.: J. Amer. Med. Asso., 158:4 (May 28, 1955), pp. 261–263.

Canadian Med. Asso. Jour., October 1942, pp. 344–349.

Spalton: Pharmaceutical Emulsions and Emulsifying Agents, The Chemist and Druggist, London, 1950, pp. 14–16.